United States Patent [19]
Crowley

[11] 3,708,071
[45] Jan. 2, 1973

[54] HOLLOW FIBER MEMBRANE DEVICE AND METHOD OF FABRICATING SAME

[75] Inventor: Richard P. Crowley, Wellesley Hills, Mass.

[73] Assignee: Abcor, Inc., Cambridge, Mass.

[22] Filed: Aug. 5, 1970

[21] Appl. No.: 61,307

[52] U.S. Cl.................................210/321, 264/277
[51] Int. Cl. ............................................B01d 31/00
[58] Field of Search ......210/22, 23, 321, 500; 55/16, 55/158; 264/41, 49, 258, 177, 277, 274, 200

[56] References Cited

UNITED STATES PATENTS

| 3,528,553 | 9/1970 | Caracciolo | 210/321 |
| 3,339,341 | 9/1967 | Maxwell et al. | 55/158 X |

Primary Examiner—Frank A. Spear, Jr.
Attorney—Richard P. Crowley and Richard L. Stevens

[57] ABSTRACT

A method for preparing one or more terminal headers containing capillary fibers encased therein for use in a membrane device. The ends or a loop portion of a plurality of capillary fibers are immersed in a foam material. The foam material sets, encasing the capillaries therein forming a header. The header is then severed, exposing the open ends of the capillaries.

26 Claims, 7 Drawing Figures

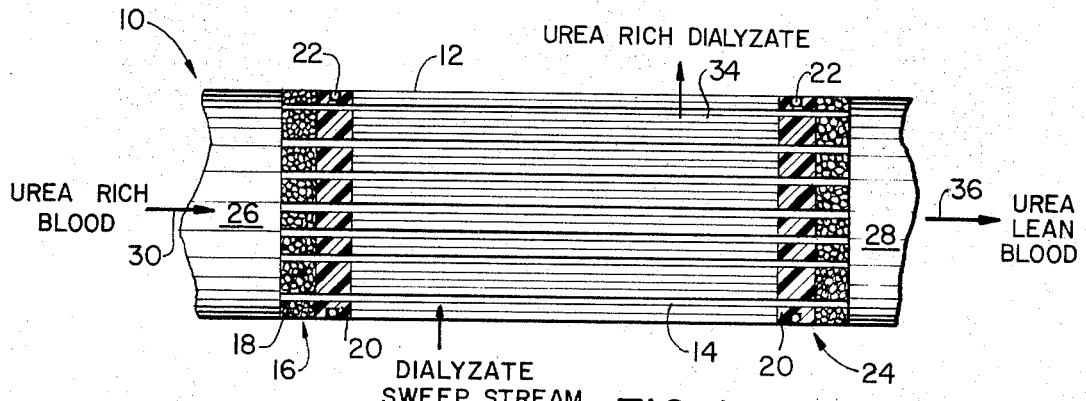
FIG. 1
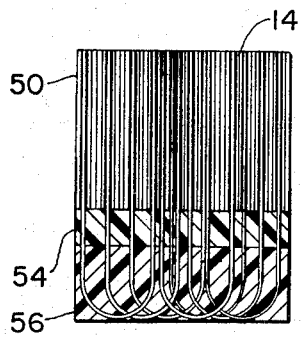
FIG. 2A
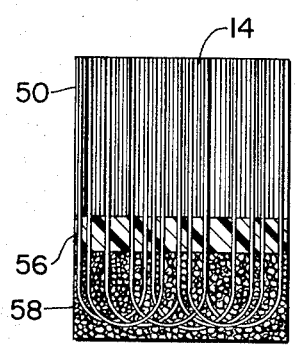
FIG. 2B
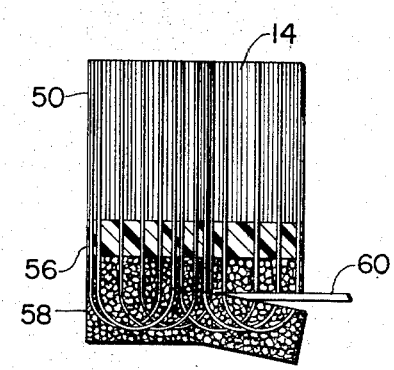
FIG. 2C
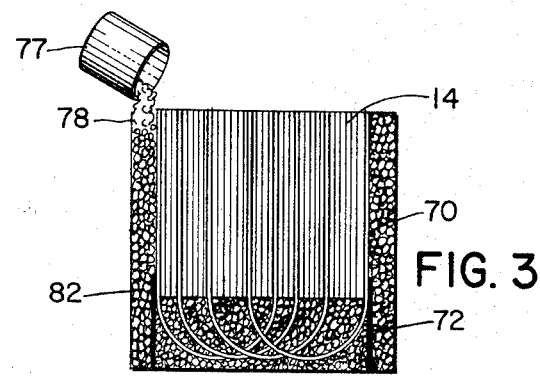
FIG. 3
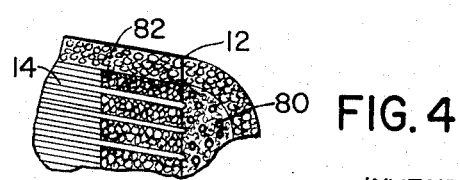
FIG. 4
FIG. 5
INVENTOR
RICHARD P. CROWLEY
BY Crowley & Stevens
ATTORNEYS

HOLLOW FIBER MEMBRANE DEVICE AND METHOD OF FABRICATING SAME

BACKGROUND OF THE INVENTION

Membrane devices to resolve selectively the different components on the basis of permeability of a multicomponent fluid stream, particularly devices employing a plurality of hollow or capillary fibers, have been prepared and suggested for a number of processes. Hollow fiber membrane devices, in particular, have been suggested for use in the dialysis of body fluids, such as the removal of toxic substances from blood, for example, as an artificial lung, as well as for use in the removal of salts from saline and brackish waters. U.S. Pat. Nos. 3,228,876 and 3,228,877 both describe hollow fiber membrane devices and processes. In such devices, the material selected for the hollow fiber divides the membrane device into a feed zone and a permeate zone, whereby a feed stream, which may be introduced internally or external of the fibers, is resolved into a permeate-lean and a permeate-rich stream based on the permeability properties of the selected wall material of the hollow fibers. The selection of the hollow fiber material is typically based upon the feed stream to be separated and would include polymeric materials, such as cellulose, cellulose esters, cellulose ethers, olefinic resins, silicone resins and other polymers. The material selected may be treated, for example, with solvents to enhance the permeability or the selectivity of the material.

The hollow fibers of this process employed in membrane devices are typically encased at one or at opposite ends in a hardened polymeric mixture, such as an epoxy resin mixture. The hardened resin forms terminal end pieces at each end of the hollow fibers called headers. Gasketing material is then placed around the outer periphery of each header, and the header inserted into a shell so that the headers are in a fluid-tight contact with the interior wall of the outer shell. One surface of each of the headers is characterized by a plurality of exposed open ends of the hollow fibers, while the solid resin material forms a fluid seal about the exterior terminal portions of the hollow fibers.

In one technique described more particularly in U.S. Pat. No. 3,442,002, a plurality of hollow fibers are gathered in loop form and the loops of the fibers are then immersed in a solidifiable liquid, such as an epoxy resin mixture, which is then permitted to harden. After hardening, the cast hardened resin is cut in order to sever the looped ends of the hollow fibers. In this manner, a header is formed at opposite ends of the hollow fibers, having a surface wherein the open ends of the hollow fibers are exposed, while the terminal exterior portions of the fibers are bonded to and embedded in and extend through the remaining portion of the cast resin header.

There are a number of disadvantages associated with the present methods of forming headers containing polymeric fibers. One disadvantage concerns the cost of the polymeric header material. When a membrane device is being employed in contact with body fluids, it is typically composed of a solid silicone rubber, the cost of which may form a considerable portion of the total cost of the device. Secondly, the cast headers often require the addition of a peripheral gasket or other sealing techniques in order to place them into fluid-tight contact with the interior wall of the outer shell. Thirdly, the solid resin adds to the weight of the total device; and weight, particularly in the use of a membrane device as a disposable artificial kidney, is often a disadvantage. Fourthly, the various operations that are employed to expose the open ends of the hollow fibers, whether in a wound, loop, or open-end arrangement, often cause difficulties in that in the grinding, abrading, severing, cutting or other operation, a great deal of effort and energy is extended in order to cut, in addition to the hollow fibers, the hardened resin. Often, in severing cellulosic hollow fibers or cellulose acetate hollow fibers encased in a hardened epoxy resin header through employing a cutting knife, the cutting edge of the knife rapidly becomes dull due to the necessity to cut the hardened resin in between hollow fibers. In addition, such cutting force is often required that damage may and can occur to the sealing properties between the exterior portions of the hollow fibers and the hardened resin as well as damage to the ends of the hollow fibers themselves. In some cases, the hollow fibers are crushed, split, distorted or otherwise transformed. It is therefore advantageous to fabricate membrane devices composed of hollow fibers wherein methods of fabrication of the headers and the use of headers in such devices will overcome one or more of these disadvantages.

SUMMARY OF THE INVENTION

My invention comprises an improved membrane device composed of a plurality of hollow fibers, the method of fabricating said device, and the use of said device, in which the hollow fibers are encased, at least in one end, in a header so that the exposed open ends of the fibers are present on one surface of the header, and the terminal exterior portions of the fibers are encased in or surrounded by a foam material. In particular, my invention concerns a membrane device wherein opposing ends of a plurality of hollow fibers, arranged substantially in parallel form, are encased in headers composed of polymeric resilient foam material, one surface of each header containing the exposed open ends of the fibers.

More particularly, my invention relates to a method which comprises encasing a hank or the ends of hollow capillary fibers in a foamed or foamable polymeric mixture, and thereafter exposing the open ends of the fibers by cutting the ends in the foam material.

My improved membrane device comprises in combination an outer shell and a plurality of hollow or capillary fibers, the external wall portions of which fibers, at least at one end thereof, are encased in a header, and the peripheral portion of the header placed in a fluid-tight relationship with the interior wall of an outer shell, the hollow fibers being composed of a material selected to provide the desired separatory and permeability characteristics so as to resolve a feed stream into a permeate-rich stream and a permeate-lean stream. One surface of the header is characterized by exposed open ends of the fibers thereon, whereby, a fluid stream may be introduced into the interior portions of the fibers or withdrawn therefrom.

The header is composed, at least in part, of a polymeric substantially foam material, which foam material surrounds the exterior wall portion of the hollow fibers, and is bonded thereto so as to provide a sealing relationship between the fibers and the foam material. Although membrane devices employing only a single header may be used in accordance with my invention, it is more typical to employ opposing headers at each end of the hollow fibers. The hollow fibers may be arranged in a parallel, twisted, or in a wound form or arrangement with or without the use of a central porous or perforated tube supporting the fibers and employed to introduce or withdraw a stream exterior of the fibers. Where desired, the peripheral portion of the polymeric foam headers may be made smooth and gaskets or adhesive techniques employed in order to provide the fluid-tight relationship within the outer shell.

My method of fabricating headers for employment in an improved membrane device comprises: immersing the open ends or looped ends of a plurality of hollow fibers in a liquid gas-expandable or prefoamed resin material in a header mold; expanding the resin material in the mold where necessary, preferably at a low temperature, or hardening the prefoamed material to form a cast cellular header containing the hollow fibers, the exterior wall portions of the hollow fibers encased and bonded thereto, severing the cast cellular header such as to expose the open ends of the hollow fibers in the cast header, and thereafter, employing the hollow fibers so encased within an outer shell to form an improved membrane device, such as an artificial kidney.

In my method of fabrication, it is preferable to employ a foam material which is flexible or semirigid rather than rigid so that the hollow fibers and headers so encased may be more shock-resistant and prone to handling during the cutting and the later fabrication of the headers and hollow fibers into the membrane device. In addition, the use of a flexible or semirigid foam material often enables the foam header used to be directly placed in a fluid-tight relationship with the interior wall of the outer shell without the necessity of adhesives or gaskets. Typically, one or both opposing ends of the hollow fibers in either parallel form or in spiral or helical wound or other form are immersed in the gas-expandable liquid or foamed resin mixture. The employment of hollow fibers in hanks, whereby the looped ends of the fibers are inserted in the liquid resin, is often the preferred method of fabrication, since such operation prevents the liquid resin from being attracted by capillary attraction into the hollow fibers.

However, where a prefoamed hardenable mixture is used, the open ends of the capillary fibers may be immersed in this foam with a substantial reduction in any capillary attraction due to the lack of liquid resin in this foam form. When resin becomes lodged in the capillary ends, then the cutting operation must be performed sufficiently downstream to sever the plugged ends and provide all open ends. Where desired, the exterior wall portions of the hollow fibers immersed in the liquid material may contain or be coated with a tie-in coat or adhesive or other material in order to enhance or aid the bonding of the foam material to the external walls, thereby preventing leakage. For example, the external walls of the hollow fibers may be treated with a silicone-type material, such as a siloxane or an adhesive resin to improve the adhesion characteristics between the foam material and the hollow fiber material, particularly where the foam and hollow fiber material are not compatible or are different materials.

The use of a foam material to form all or a portion of the headers in hollow fiber membrane devices encompasses a number of advantages, including reduced weight and cost for the header materials, but in addition, where the foam material is resilient or flexible or semirigid, such foam material enhances the handling characteristics and shock resistance of the hollow fibers in the headers. Furthermore, the use of a foam material considerably reduces the cutting effort required in order to expose the open ends of the hollow fibers in the polymeric foam headers, since the severing of the polymeric foam header is relatively easy and most of the energy therefore can be directed toward the severing of the hollow fibers, thereby providing longer knife wear, better cutting characteristics, and ease of manufacture. Further, the use of prefoamed material solves plugging of the open ends of the capillaries where a hank or loop approach is wasteful. The term "severing" used herein is used and employed in the meaning of cutting, abrading, severing, grinding or any other operation by which the surface of the header material and fiber ends are removed in order to expose the open ends of the fibers therein. The employment of a substantially closed cell, for example, over 90% of noninterconnecting cells in the foam material, provides for bonding of the foam material through the exterior wall of the hollow fibers, but yet, prevents the passage of a fluid stream therethrough.

The material selected as the foam material may be any foam material which provides closed-cell or open-cell foams, but preferably, flexible or semirigid foams. Where open-cell foam material is employed, then one surface of the header must be sealed with a solid resin or a closed-cell foam material to prevent passage of the liquid stream between the fibers. It is often desirable that such foam materials be compatible with or similar to the polymeric material or materials of which the hollow fibers are composed so as to provide good bonding between the interstitial foam material and the external walls of the hollow fibers which the foam material surrounds. It is also often desirable to select a material which on mixture of two more components or slight heating will foam to the desired density and harden at a temperature such that excessive harm or damage to the hollow fibers, particularly where the hollow fibers are thermoplastic, shall not occur or is diminished. Where the membrane device employing such foam headers is to be used in connection with body functions, such as in the dialysis of body fluids, then such foam materials should be nontoxic and medically accepted; for example, a silicone resin or rubber foam material in an artificial lung or artificial kidney device.

Typical materials which may be used to form the foam headers would include, but are not limited to: vinyl resins, such as polyvinyl chloride and vinyl chloride-vinyl acetate and other vinyl chloride copolymers and blends such as curable acrylic-vinyl chloride resins; olefinic resins, such as polyethylene, polypropylene and ethylene-propylene copolymers as well as silicone resins and rubbers, for example, wherein two or more components are foamed at a temperature of 20°–40°C into a closed-cell silicone foam, such as RTV silicone (room temperature vulcanizable); urethane resins wherein a polyisocyanate like a diisocyanate is reacted with a compound, such as a glycol, in order to form a closed-cell urethane foam as well as natural and synthetic elastomeric material, such as conjugated diene materials such as natural rubber, styrene-butadiene rubber, chloroprene, butyl rubber, nitrile rubber, such as acrylonitrile as well as butadiene-styrene-acrylonitrile rubbers and other such materials. Examples of urethane resins are set forth in U.S. Pat. Nos. 3,072,582; 3,102,875; 2,827,665; 3,397,158; and 3,398,106. The foam may be generated and prepared in a number of different ways, such as by the employment of chemical blowing agents in the polymeric composition, such as azodicarbonamide in vinyl chloride plastisols or by internally generated gases, such as carbon dioxide in the preparation of urethane resins, or by mechanical whipping in of vaporizable liquids or gases such as air or halocarbons in the case of rubber and natural and synthetic latexes.

The materials employed to encase the hollow capillary fibers in a foam may be those materials which are foamed in place or those materials which are prefoamed. Typical foamed-in-place materials would include vinyl resin plastisols containing polyvinyl chloride or vinyl acetate copolymers as well as those carboxylated vinyl chloride resins subject to cure by reaction with amino resins, such as melamine resins at relatively low temperatures. Typically, the vinyl chloride plastisols contain a plasticizer, such as from about 40 to 100 parts of plasticizer of dioctyl phthalate per 100 parts of resin, a stabilizer, such as a zinc cadmium salt like a zinc cadmium 2-ethylhexylate in an amount from about 1 to 3 parts and a blowing agent, such as from about 1 to 10 parts of azodicarbonamide. This composition on being heated to a temperature of about 160° to 200°C will provide a fused foam vinyl chloride resin material. The same or a similar mixture without the blowing agent may be employed in order to provide a solid sealing resin layer adjacent the blowing vinyl chloride foamed-in-place resin layer.

Other foamed-in-place materials would include urethanes wherein two or more multicomponent mixtures of a diisocyanate or polyol and a catalyst like an imine or a metallic catalyst are mixed together in which the mixture is subsequently foamed. An additional foamed-in-place material would include the RTV silicone rubber. The foam material after foaming where desired, either before or after the severing operation, may be reticulated; that is, the cellular walls wholly or partially destroyed by the use of caustic solvents or other chemical or mechanical treatment. The size of the foam material; that is, the cellular size, may vary, depending on the nature of the header desired.

In addition to foamed-in-place material, there are prefoamed materials which may be foamed and then poured into a mold or the hollow capillary fibers inserted in the prefoamed material and the foam material then permitted to harden by curing, heating, fusing, radiation or other techniques. Typical foamed-in-place materials would include, for example, natural and synthetic elastomers, such as butadiene-styrene or carboxylated elastomers, such as carboxylated butadiene-styrene rubber which may be prefoamed by mechanical whipping of air into the latex through the use of an Oakes mixer typically in the presence of a siloxane material to provide cell control, and the prefoamed material then fused to insert the hanks or ends of the capillary fibers and then hardened by heating. Typically, the latex would include, for example, in the case of a carboxylated latex, a small amount of a cross-linking agent to effect or cure a cross-linking of the prefoamed material, such as a melamine or urea-formaldehyde resin, a polyisocyanate or the like. Vinyl chloride resin plastisols and organosols may also be prefoamed by addition of small amounts of siloxane, such as a dimethyl siloxane polymeric fluid, and then mechanically whipping in air. Other prefoamed material may be formed by the use of liquid halocarbons, such as freons.

Depending on the conditions involved, closed or substantially closed or substantially open-cell foam material may be obtained, for example, with RTV silicone rubber a substantially closed-cell foam is obtained, while with a prefoamed butadiene-styrene, a substantially open-cell foam material is obtained as with the urethanes. If substantially open-cell foam material is employed, one or more sealing layers to fill the interstices between the individual hollow capillary fibers or bundles of such fibers should be employed which may be the same or a different material. For example, where a blowable vinyl chloride plastisol is employed, a non-blowable vinyl chloride plastisol of the same type may be used as the sealing layer, and similar techniques may be employed with the silicone resins or rubbers.

The hollow fibers employed in the membrane device are well known and include those hollow fibers composed of cellulose, regenerated cellulose, cellulose esters like cellulose acetate, cellulose acetate butyrate and cellulose ethers as well as olefinic resins like polypropylene, polyamides like nylon, acrylic resins, silicone polymers, glass fibers and other materials.

In another embodiment of my invention, my polymeric headers may be used in combination with solid resinous material; that is, headers may be employed having a combination of a foam material and a solid material, particularly where it is desired to insure the security of the hollow fibers in a solid resinous mass and to prevent leaks, and yet to employ the advantages of foam in the fabrication of the headers. In such an embodiment, that portion of the header which is to be severed to expose the open ends of the foam is composed of a foam material, while the opposite surface of the same header contains a layer of a solid material bonded to the foam material. In this manner, the hollow fibers may be severed when they are encased in the foam material and yet retained in a rigid fluid-tight sealing relationship with the solid header material which backs up the foam material.

My invention will be illustrated in particular by the following examples and drawings wherein a multicomponent header is formed employing parallel hollow fibers in the preparation of an artificial kidney device. However, these examples and drawings are illustrative only of the advantages and techniques of my invention.

BRIEF DESCRIPTION OF THE DRAWINGS

FIG. 1 is an enlarged cross-sectional illustrative view of an improved membrane device employing a foam-solid header.

FIG. 2, which includes FIGS. 2A, 2B, and 2C, is a schematic illustrative view of one method of preparing the headers of FIG. 1.

FIG. 3 illustrates in schematic form another technique for encasing hollow fibers in a prefoamed material.

FIG. 4 is an enlarged illustrative fragmentary view of the header formed by FIG. 3 in a membrane device.

FIG. 5 is a block diagram of a process to foam a header composed of closed-cell foams surrounding a plurality of hollow fibers.

DESCRIPTION OF THE PREFERRED EMBODIMENTS

In FIG. 1 is shown a membrane dialysis unit 10 employed, as in an artificial kidney unit, which includes a plurality of capillary membrane fibers 14 arranged in generally parallel relationship within a shell 12. At either end of the capillaries are headers 16 and 24. Each of the headers includes a first foamed layer 18 having an outer facing surface therein in which surface are the open ends of the capillary fibers. The header 16 is in communication with the inlet chamber 26. The header 24 is in communication with the outlet chamber 28. The second layer of the headers 16 and 24 includes a solid sealing resin layer 20 in the interstitial area between the fibers 14.

An O-ring sealing gasket 22 is used to provide a fluid-tight seal to the internal wall of the shell 12. The volume interior of the shell 12 and exterior of the fibers is shown as 34. In operation, urea-rich blood enters chamber 26, the open ends of the capillary fibers 14 in the header and urea-lean blood removed from the other end of the fibers and withdrawn from chamber 28. The urea and other salts permeate the walls of the fibers 14, and are removed along with the dialyzate stream from volume 34.

Referring to FIGS. 2A, 2B and 2C, looped ends of the capillaries 14 are disposed in a vessel 50. A vinyl resin plastisol containing, for example, polyvinyl chloride and containing a plasticizer, such as from about 40 to 100 parts of plasticizer of dioctyl phthalate per one hundred parts of resin, a stabilizer such as a zinc cadmium salt like a zinc cadmium 2-ethylhexylate in an amount of from about 1 to 3 parts per hundred parts of resin and a blowing agent such as an azodicarbonamide in about 1 to 10 parts of blowing agent per hundred parts of resin is poured in the vessel. This vinyl chloride plastisol is shown in FIG. 2A at 56 prior to being blown. Disposed next to the blowable vinyl chloride plastisol is a similar mixture 54 without the blowing agent which is utilized to provide the solid sealing resin layer adjacent the blowable vinyl chloride foamed-in-place resin layer. After being heated to a temperature of about 160° to 230°C, a foamed layer 58 is provided fused to the sealing-fused resin layer 56 as shown in FIG. 2B. Referring to FIG. 2C, a knife 60 or other implement is used to cut through the foamed layer 58 to expose the open ends of the capillaries on the facing surface of the header 16.

The headers in FIG. 1 and as described for FIG. 2 have been illustrated using two layers, a foamed layer through which a knife cuts to expose the ends of the capillaries and a sealing layer to insure a fluid-tight seal. In this particular embodiment, of course, other solid sealing and expandable resins may be used, such as solid silicone rubber, for example, RTV silicone rubber or epoxy resins as commonly employed alone now in the prior art. Further, when the solid sealing resin layer is used, then, of course, either closed-cell foam or open-cell foam may be used as the layer 18.

In FIGS. 3 and 4 is illustrated an application of using a prefoamed material to form the header rather than a foamed-in-place material. As shown in FIGS. 3 and 4, a prefoamed material, such as a styrene-butadiene or carboxylated elastomers, such as, for example, a carboxylated butadiene-styrene rubber which may be prefoamed by mechanical whipping of air into the latex, generally in the presence of a siloxane material to provide cell control, may be utilized or a vinyl chloride resin plastisol which contains a small amount of a surface depressant like a dimethyl siloxane polymeric liquid which may be foamed by the same method. The prefoamed resin 78 is poured from a container 76 into the vessel 70. A hank of capillary fibers 14 (or open-ended fibers not shown) is disposed in the vessel 70. A partition 72 within the vessel defines a chamber which provides for an additional foam peripheral thickness 82 about the capillary fibers. The foam material is then cured or hardened, such as by heating. After the foam has been set and the fiber ends severed, referring to the fragmentary view shown in FIG. 4, the ends of the capillaries which are now exposed on the cut surface of the header 80 are encased within the prefoamed material 78. The additional peripheral thickness of the flexible foamed material 82 is shown as being fitted into sealing engagement with the inner peripheral wall of the shell 12. In this particular embodiment, the need for separate gasket rings or other sealing device is obviated. Of course, if desired, a foamed-in-place material may be utilized within the inner chamber defined by the partition 72 and a separate foamed-in-place material placed in the chamber 82 or a prefoamed material or if desired, another gasket-type-material. In the technique shown, the foam material should be substantially a closed-cell foam, like a silicone rubber (RTV) foam; otherwise a sealing resin should be applied to provide a fluid-tight seal.

Having thus described my invention, what I claim is:

1. In a method of preparing a membrane device wherein a plurality of hollow capillary fibers composed of a material to permit the separation by membrane permeation techniques of a feed stream into a permeate-lean and a permeate-rich fraction, the walls of the hollow fibers comprising the membrane material and dividing the device into a permeate zone and a feed zone are disposed with an outer shell and at least one header, which header is arranged in a fluid-tight manner to the interior wall of the outer shell, the open ends of the fibers in the headers exposed on one surface thereof to permit the introduction into or the withdrawal from the interior of the exposed ends of the fibers of a fluid stream, the improvement which comprises:
   a. encasing the hollow fibers in a header material, which material comprises at least in part a first layer of cellular material;
   b. encasing the hollow fibers in a second layer of solid polymeric material to provide a fluid-tight seal between the exterior walls of the hollow fibers and the polymeric material; and
   c. severing the fibers encased in the cellular layer to expose the open ends of the hollow fibers in that layer, thereby inhibiting damage to the hollow fibers and enhancing the ease of severing of the fibers during the severing operation.

2. The method of claim 1 which includes encasing the hollow capillary fibers in a semirigid polymeric cellular material substantially composed of noninterconnecting closed cells, the cellular material forming a fluid-tight seal between the exterior walls of the fibers to prevent the passage of material through the interstices between the fibers.

3. The method of claim 1 which includes encasing the hollow fibers in a flexible polymeric cellular material and exposing the open ends of the fibers along a single plane in the cellular plane by cutting the hollow fibers in the cellular plane.

4. The method of claim 1 which includes encasing the hollow fibers in a cellular material selected from the group of polymeric material consisting of urethane resins, vinyl halide resins, olefinic resins and silicone resins.

5. The method of claim 1 which includes encasing the hollow fibers in the cellular material prior to treating the exterior walls of said hollow fibers to be placed in the said material with a bonding agent to secure an enhancement in bonding strength between the exterior walls of the hollow fibers and the cellular material.

6. The method of claim 1 which includes encasing one portion of the hollow fibers in a liquid hardenable resin material and an adjoining portion in a liquid gas-expandable resin material; and thereafter, hardening the liquid hardening material to form a fluid-tight seal between the exterior walls of the hollow fibers in said hollow hardened material; and expanding and hardening the gas-expandable material to form a plane of cellular material bonded to and adjacent the solid material.

7. The method of claim 1 which includes encasing the hollow fibers in a flexible cellular material which extends at least slightly beyond the external perimeter of the hollow fibers and thereafter, encasing the cellular header so formed within the outer shell, the external portion of the cellular material being in sealing contact with the interior wall of the outer shell.

8. The method of claim 1 which includes encasing opposing ends of substantially parallel hollow fibers in a header material, which material comprises in part a plane of cellular material and severing the cellular material and the hollow fibers so as to provide for the exposed ends of the hollow fibers at each opposing surface of the headers so formed, and thereafter, securing said headers within an outer shell to form a membrane device.

9. The method of claim 1 which includes immersing the hollow capillary fibers in a polymeric foam material, hardening the foam material about the exterior walls of the hollow fibers to form a plane of cellular material, and thereafter, cutting the hollow fibers in said plane of cellular material to expose the open ends thereof.

10. The method of claim 1 wherein the cellular material is a flexible or semirigid cellular material, the header consisting essentially of such cellular material and the fibers.

11. The method of claim 1 wherein the capillary fibers and cellular material are selected and adapted for use in an artificial kidney device.

12. A method of fabricating a header suitable for use in a membrane device, which header contains embedded therein a plurality of hollow capillary fibers and which method comprises:
  a. inserting a plurality of the hollow capillary fibers into a multicomponent liquid polymeric material, one of which materials is a gas-expandable polymeric material adapted to form a cellular material and to enable the hollow fibers to be cut, and the other liquid material containing a hardenable polymeric material adapted to form a fluid-tight seal with the exterior walls of the hollow fibers;
  b. expanding and hardening the polymeric material to form a cellular material and a solidified hardened polymer containing the hollow fibers therein; and
  c. exposing the ends of the hollow fibers while contained in the cellular material, thereby producing a header, one surface of which contains exposed ends of hollow fibers, while the hollow fibers are embedded in the cellular material and sealed with the solidified polymer.

13. The method of claim 12 which includes inserting a hank containing a plurality of hollow capillary fibers into the liquid polymeric material and exposing the ends of the hollow fibers by severing the hank in the cellular polymeric material, thereby providing a header containing cellular materials with substantially parallel hollow fibers embedded therein.

14. In a capillary membrane unit having an outer shell, a plurality of capillary fibers disposed within the shell, the walls of the capillary fibers defining a feed zone and a permeate zone, a feed inlet for the introduction of a fluid stream, an outlet for the withdrawal of a permeate-lean stream, and an outlet for the withdrawal of a permeate-rich stream, the improvement which comprises:
  a. a header, which includes an exposed surface, comprising a polymeric foam material disposed within the shell, the header adapted for sealing engagement with the interior wall of the shell, the capillary fibers embedded in said foam material, said fibers having exposed ends lying in substantially the same plane as said exposed surface, the header comprising first and second layers, the first layer comprising the polymeric foam material, and the second layer comprising a solid sealing layer of resinous material, said resinous material forming a sealing relationship between the exterior wall portions of the fibers and said foam material.

15. The device of claim 14 wherein the capillary fibers are in a substantially parallel relationship.

16. The device of claim 14 which includes first and second headers disposed at either ends of the capillary fibers.

17. The device of claim 14 wherein the header defines in combination with the internal wall of the shell, a feed inlet chamber upstream of the exposed ends of the capillary fibers.

18. The device of claim 14 which includes first and second headers disposed at either ends of the capillary fibers and wherein the first header defines in combination with the interior wall of the shell a feed chamber in communication with the open ends of the capillaries, and wherein the second header defines in combination with the internal wall of the shell an outlet chamber, the exposed ends of the capillary fibers in said second header in communication with said outlet chamber.

19. The device of claim 14 wherein the foam material is a closed-cell foam material.

20. The device of claim 19 wherein the closed-cell foam comprises an RTV silicone rubber.

21. The device of claim 14 wherein the foam material comprises an open-cell foam material.

22. The device of claim 14 wherein the sealing layer comprises a closed-cell material.

23. The device of claim 14 wherein the foamed layer comprises a blown open-cell vinyl resin and the second layer comprises a nonblown vinyl chloride resin.

24. The device of claim 14 wherein the foamed material is a RTV silicone rubber.

25. The device of claim 14 wherein the foamed layer extends beyond the outer periphery of the capillaries to provide a sealing engagement with the interior wall of the shell.

26. The device of claim 14 wherein the foam material is a flexible or semirigid foam material, the header consisting essentially of such foam material.

* * * * *